G. H. ENDSLEY

Dec. 8, 1931. CASKET LAMP Re. 18,271

Original Filed Oct. 5, 1927 2 Sheets-Sheet 1

G. H. Endsley,
INVENTOR
BY Victor J. Evans
ATTORNEY

G. H. ENDSLEY

Dec. 8, 1931. CASKET LAMP Re. 18,271

Original Filed Oct. 5, 1927 2 Sheets-Sheet 2

G. H. Endsley,
INVENTOR

BY Victor J. Evans
ATTORNEY

Reissued Dec. 8, 1931 Re. 18,271

UNITED STATES PATENT OFFICE

GARVER H. ENDSLEY, OF FRANKFORT, INDIANA

CASKET LAMP

Original No. 1,701,447, dated February 5, 1929, Serial No. 224,215, filed October 5, 1927. Application for reissue filed September 12, 1930. Serial No. 481,564.

This invention relates to improvements in lamp brackets, particularly adapted for casket mounting.

One object is to provide a bracket which may be detachably mounted upon the opened lid of a casket to support a lamp in proper position thereabove for illuminating the interior of the casket.

Another object of the invention is the provision of a bracket for the above purpose, which may be securely engaged with the lid of a casket without injuring or marring the finish of the lid, and which may be adjusted to conform to the particular angle or curvature of the top of the lid.

Another object of the invention is the provision of a bracket, which in addition to the above and other advantageous features, is simple and attractive in construction and appearance, and may be quickly adjusted to or removed from the lid of a casket.

With the above and other objects in view, the invention further consists in the following novel features, combination and arrangement of parts, to be hereinafter more fully described, illustrated in the accompanying drawings and set forth in the appended claims.

Figure 3:
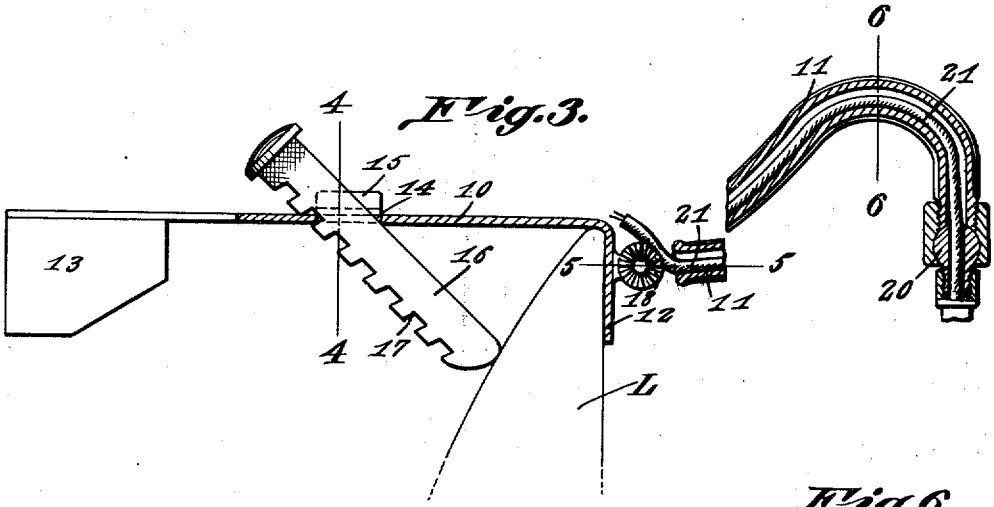
Figure 3 is a longitudinal sectional view showing a portion of the casket in end view.
Figure 4:
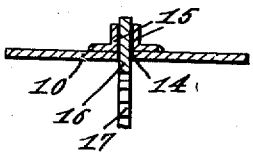
Figure 4 is a section on line 4—4 of Figure 3.
Figure 5:
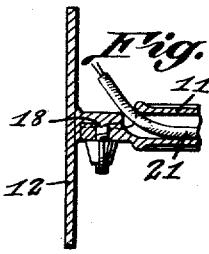
Figure 6:
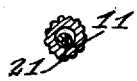

Figures 5 and 6 are sections taken respectively on the lines 5—5 and 6—6 of Figure 3.

Referring to the drawings in detail, wherein like characters of reference denote corresponding parts, the invention as shown, comprises a bracket which includes an anchor arm 10 and a lamp arm 11, the former being adapted to be engaged with the lid L of a casket C, while the latter is designed to support a lamp.

Figure 1:
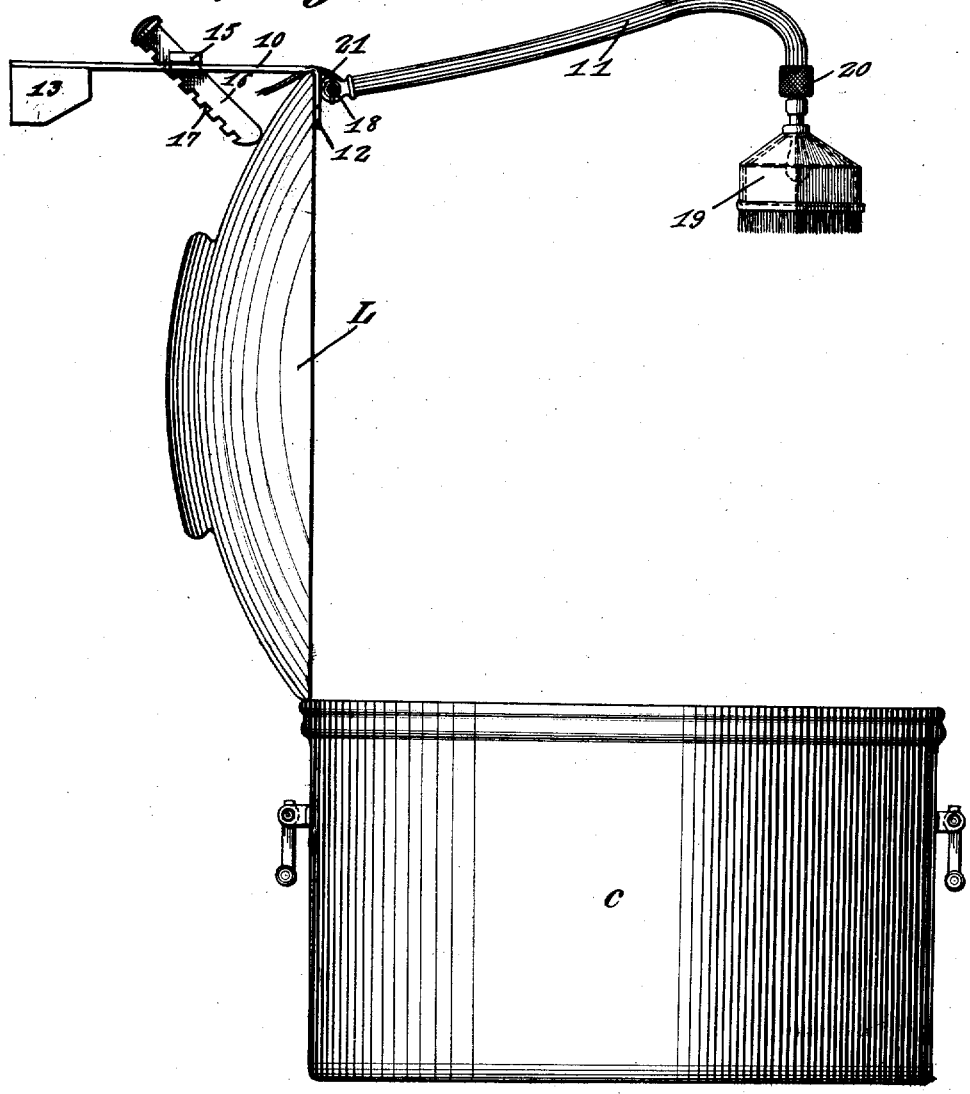
Figure 1 is an end view of a casket showing the lid open and the invention applied.

The anchor arm 10 is substantially L-shaped and is designed to be arranged transversely of the lid L, the short member 12 of the anchor arm contacting with the inner face of the lid, as shown in Figures 1 and 3 of the drawings. The arm 10 extends outwardly from the lid and its outer end is weighted as shown at 13.

Figure 2:
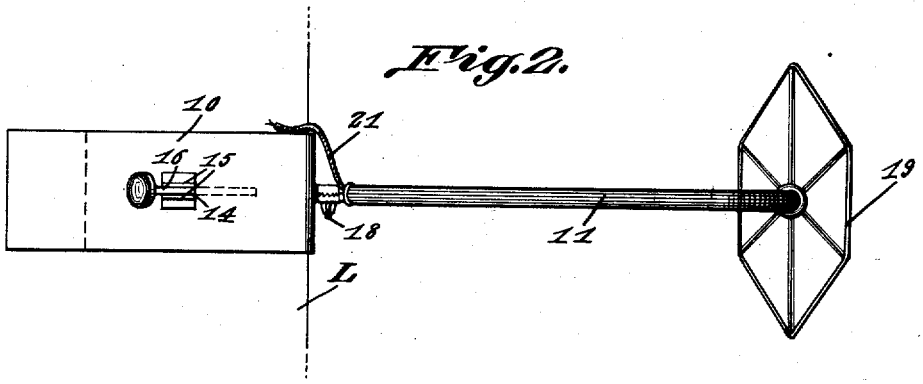
Figure 2 is a top plan view of the invention.

The weight is of a relatively large cross-sectional area at its free end, see Figs. 2 and 3 and has a plane or flat face. The arm 10 is provided with a slot 14 which has extending outwardly from its opposite edges, flanges 15, the latter forming a guide for a bar 16 which is removably and slidably received between the guide flanges. The bar 16 is provided with teeth 17 along one of its edges and these teeth are adapted to engage the arm 10 at one end of the slot 14, as shown in Figure 3 of the drawings. One end of the arm is designed to contact with the lid L in such manner as to prevent longitudinal inward movement of the arm and to prevent downward pivotal movement. The arm will thus be clamped upon the casket top without marring the top and in the manner to permit of its ready removal. As the bar 16 may be adjusted longitudinally and pivotally, it will adapt itself to the particular angle or curvature of the top of any casket no two of which are just alike. Functionally arm 16 constitutes an adjustable brace contacting the lid at the lower end and adjustment is obtained at the connection between members 10 and 16.

Pivotally and adjustably secured to the anchor arm 10, as shown at 18, is the inner end of the lamp arm 11. The outer end of this arm carries a lamp 19, which is connected to the arm by means of a universal joint 20, so that the lamp may be adjusted in accordance with the pivotal adjustment of the arm 11. The lamp arm 11 is hollow so as to accommodate a cord 21, by means of which the lamp may be connected with a suitable source of current.

The invention is susceptible of various changes in its form, proportions and minor details of construction, and the right is herein reserved to make such changes as properly fall within the scope of the appended claims.

The invention claimed is:

1. The combination with a vertically disposed supporting member, of a bracket comprising an anchor arm adapted to have one end engaged over the upper edge of the supporting member and to extend laterally therefrom, a weight at the outer end of the arm, longitudinally movable pivotally adjustable means engaged with the arm for contact with the supporting member to hold said arm against longitudinal or pivotal movement, and an arm extending outwardly from the inner end of the anchor arm.

2. The combination with a vertically disposed open casket lid, of a bracket adapted to be removably engaged over the edge of said lid and comprising an anchor arm having a slot therein, means at one end of the arm to engage over the edge of and contact with the inner face of the lid, a weight at the outer end of the arm, a bar extending through the slot of the anchor arm for contact with the lid to support the outer end of the arm and hold said arm in engagement with the lid, spaced teeth extending along one edge of the bar and engaging the edge of the slot to adjustably connect the bar and anchor arm, and a lamp arm carried by the anchor arm.

3. The combination with a vertically disposed supporting member, such as a casket lid, of a bracket comprising a rigid arm adapted to have one end extending over and across the upper edge of the supporting member, a weight at one end of the arm and spaced from the support member when the arm rests thereon, brace means adjustably engaged with the arm for contact with the supporting member, such as the lid top, to prevent said arm from moving longitudinally of or pivotally toward the top of the member a lateral extension at the opposite end of the arm for support member engagement to serve as a stop, and a support for a lamp and like carried by said extension.

4. A lamp-supporting structure for a casket, comprising an anchor arm adapted to have one end engaged over the upper edge of the open casket lid and to extend laterally therefrom, a weight at one end of the arm, the remote end of which weight is flat and extends at a right angle to said arm, a lamp-supporting extension from the other end of said arm, and means carried by the arm and longitudinally adjustable for contact with the casket lid to hold said arm against longitudinal and pivotal movement thereon.

5. A lamp-supporting structure for a casket, comprising an anchor arm adapted to have one end engaged over the upper edge of the open casket lid and to extend laterally therefrom, a lamp-supporting extension from one end of said arm, a counterweight secured to the other end of said arm, said structure being substantially rigid so that the lamp end thereof will be substantially counterbalanced by said counterweight, and longitudinally adjustable means engaged with the arm for contact with said casket lid to hold said arm against longitudinal or pivotal movement.

In witness whereof, I have hereunto affixed my signature.

GARVER H. ENDSLEY.